US010795332B2

(12) United States Patent
Giorgi et al.

(10) Patent No.: US 10,795,332 B2
(45) Date of Patent: Oct. 6, 2020

(54) FACILITATING AUTOMATING HOME CONTROL

(71) Applicants: Michael E. Giorgi, Hudson, OH (US); Patrick M. Mause, Streetsboro, OH (US); Steven Rosen, Hunting Valley, OH (US)

(72) Inventors: Michael E. Giorgi, Hudson, OH (US); Patrick M. Mause, Streetsboro, OH (US); Steven Rosen, Hunting Valley, OH (US)

(73) Assignee: RESILIENCE MAGNUM IP, LLC, Cleveland, OH (US)

( * ) Notice: Subject to any disclaimer, the term of this patent is extended or adjusted under 35 U.S.C. 154(b) by 0 days.

(21) Appl. No.: 16/247,082

(22) Filed: Jan. 14, 2019

(65) Prior Publication Data

US 2019/0219976 A1    Jul. 18, 2019

Related U.S. Application Data

(60) Provisional application No. 62/617,916, filed on Jan. 16, 2018.

(51) Int. Cl.
*G06N 20/00* (2019.01)
*G06K 9/00* (2006.01)
(Continued)

(52) U.S. Cl.
CPC ....... *G05B 19/042* (2013.01); *G06K 9/00288* (2013.01); *G06K 9/00885* (2013.01);
(Continued)

(58) Field of Classification Search
CPC .......... G06N 20/00; G06N 3/08; G05B 15/02; G05B 2219/2642; G05B 2219/25323;
(Continued)

(56) References Cited

U.S. PATENT DOCUMENTS

2010/0321151 A1* 12/2010 Matsuura ................ G06F 21/32
340/5.52
2017/0109983 A1* 4/2017 Flint ................... H04M 1/0291
(Continued)

*Primary Examiner* — Michael J Brown
(74) *Attorney, Agent, or Firm* — Amin, Turocy & Watson, LLP

(57) ABSTRACT

Systems, computer-implemented methods and/or computer program products that facilitate automating home control are provided. In one embodiment a computer-implemented method comprises: using a voice recognition component to identify user identification by analyzing voice signatures; using a face recognition component to determine user identification by analyzing facial features; using an authentication component to verify user identification and authorize control access to functionality of one or more automated home control systems; using a communication component to facilitate communication between the one or more automated home control systems and one or more devices; using a service component to execute a set of functions based on authorized user commands and information communicated from the one or more devices; and using a machine learning component to learn user preferences by correlating a set of functions with the authorized users commands.

20 Claims, 9 Drawing Sheets

(51) Int. Cl.
*G06K 9/62* (2006.01)
*G10L 17/00* (2013.01)
*G10L 17/06* (2013.01)
*H04L 12/28* (2006.01)
*G05B 19/042* (2006.01)
*H04L 29/06* (2006.01)
*G10L 17/22* (2013.01)
*G06N 3/08* (2006.01)
*G05B 15/02* (2006.01)
*G05B 17/02* (2006.01)

(52) U.S. Cl.
CPC ............ *G06K 9/6278* (2013.01); *G06N 20/00* (2019.01); *G10L 17/00* (2013.01); *G10L 17/06* (2013.01); *G10L 17/22* (2013.01); *H04L 12/2803* (2013.01); *H04L 12/2816* (2013.01); *H04L 63/10* (2013.01); *G05B 2219/2642* (2013.01)

(58) Field of Classification Search
CPC ............ G05B 2219/2615; G05B 17/02; G05B 2219/23021; G05B 2219/23026; G05B 2219/39254; G05B 23/024; G05B 23/0283; G06K 9/00288; G06K 9/00885; G06K 9/6278; G10L 17/005; G10L 17/06; G10L 17/17; H04L 12/2816; H04L 12/2803; H04L 63/10
USPC ........................................................ 700/275
See application file for complete search history.

(56) References Cited

U.S. PATENT DOCUMENTS

2018/0102045 A1\* 4/2018 Simon .................... G08B 25/08
2018/0233141 A1\* 8/2018 Solomon .............. G06K 9/6255

\* cited by examiner

FACILITATING AUTOMATING HOME CONTROL

CROSS-REFERENCE TO RELATED APPLICATIONS

This application claims priority to U.S. Provisional Patent Application Ser. No. 62/617,916 filed on Jan. 16, 2018, entitled "FACILITATING AUTOMATING HOME CONTROL." The entirety of the aforementioned application is incorporated by reference herein.

BACKGROUND

The subject disclosure relates to facilitating automating home control, and more specifically, providing different levels of access to functionality based on user identification.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products facilitating automating home control are described.

According to one embodiment, an automated home control system is provided. The system can comprise a processor that executes computer executable components stored in a memory. The computer executable components can comprise a voice recognition component that identifies user identification by analyzing voice signatures. The computer executable components can further comprise a face recognition component that determines user identification by analyzing facial features. The computer executable components can further comprise an authentication component that verifies user identification and authorizes control access to functionality of one or more automated home control systems. The computer executable components can further comprise a communication component that facilitates communication between the one or more automated home control systems and one or more devices. The computer executable components can further comprise a service component that executes a set of functions based on authorized user commands and information communicated from the one or more devices. The computer executable components can further comprise a machine learning component that learns user preferences by correlating a set of functions with the authorized user commands.

According to another embodiment, a computer-implemented method for facilitating automating home control is provided. The computer-implemented method can comprise employing a processor to execute computer executable components stored in a memory. The computer-implemented method can further comprise using a voice recognition component to identify user identification by analyzing voice signatures. The computer-implemented method can further comprise using a face recognition component to determine user identification by analyzing facial features. The computer-implemented method can further comprise using an authentication component to verify user identification and authorize control access to functionality of one or more automated home control systems. The computer-implemented method can further comprise using a communication component to facilitate communication between the one or more automated home control systems and one or more devices. The computer-implemented method can further comprise using a service component to execute a set of functions based on authorized user commands and information communicated from the one or more devices. The computer-implemented method can further comprise using a machine learning component to learn user preferences by correlating a set of functions with the authorized user commands.

According to an embodiment, computer program product for facilitating automating home control is provided. The computer program product can comprise a computer readable storage medium having program instructions embodied therewith. The program instructions can be executable by a processor to cause the processor to use a voice recognition component that identifies user identification by analyzing voice signatures. The program instructions can further be executable by a processor to cause the processor to use a face recognition component that determines user identification by analyzing facial features. The program instructions can further be executable by a processor to cause the processor to use an authentication component that verifies user identification and authorizes control access to functionality of one or more automated home control systems. The program instructions can further be executable by a processor to cause the processor to use a communication component that facilitates communication between the one or more automated home control systems and one or more devices. The program instructions can further be executable by a processor to cause the processor to use a service component that executes a set of functions based on authorized user commands and information communicated from the one or more devices. The program instructions can further be executable by a processor to cause the processor to use a machine learning component that learns user preferences by correlating a set of functions with the authorized user commands.

In some embodiments, elements of one or more computer-implemented methods can be embodied in different (or a combination of) forms. For example, one or more elements of a computer-implemented method may be embodied (without limitation) as (or with) a system, a computer program product, and/or another form.

DETAILED DESCRIPTION

Figure 1:
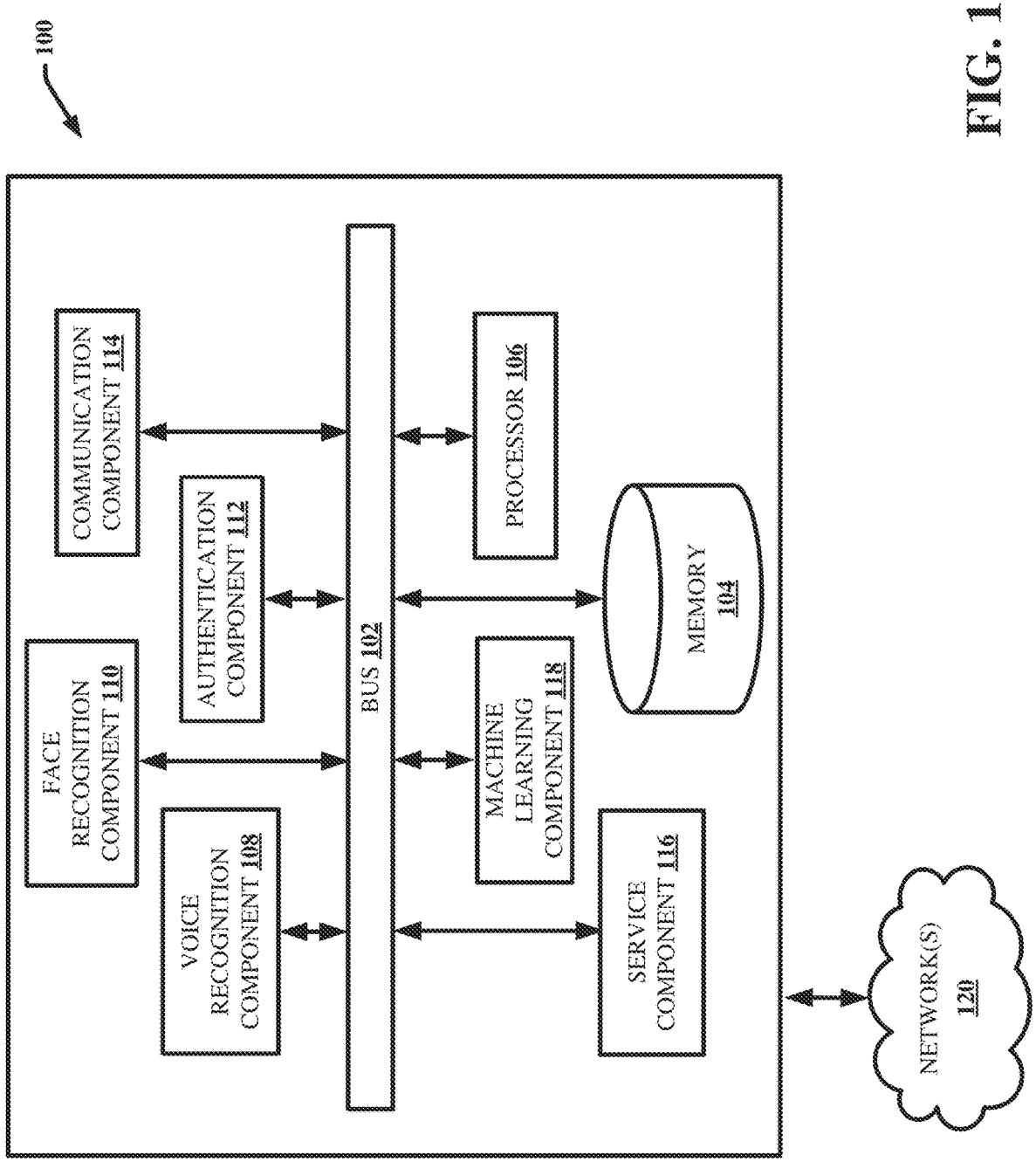
FIG. 1 illustrates a block diagram of an example, non-limiting system facilitating automating home control in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

One or more embodiments of the subject disclosure describes utilizing machine learning systems to facilitate automating home control in accordance with one or more embodiments described herein. Embodiments described and claimed herein utilize machine learning systems that have been explicitly or implicitly trained to learn, determine or infer user preference and regulate home environmental settings (e.g., lighting and temperature). For example, and as will be described in greater detail below, the machine learning system can correlate home environmental setting with user voice signatures and facial features in connection with determining user preference in order to regulate environmental settings of a home.

The subject disclosure is directed to computer processing systems, computer-implemented methods, apparatus and/or computer program products that facilitate efficiently and automatically (e.g., without direct human involvement) regulating home environmental settings utilizing machine learning to help achieve user preference. Humans are also unable to perform the embodiments described here as they include, and are not limited to, performing, e.g., complex Markov processes, Bayesian analysis, or other artificial intelligence based techniques based on probabilistic analyses and evaluating electronic information indicative of user preference, determining whether countless multitudes of probability values assigned to user preference exceed or fall below various probability values.

The computer processing systems, computer-implemented methods, apparatus and/or computer program products employ hardware and/or software to solve problems that are highly technical in nature. For example, problems are related to automated processing, determining or inferring user preference. These problems are not abstract and cannot be performed as a set of mental acts by a human. For example, a human, or even thousands of humans, cannot efficiently, accurately and effectively manually apply countless thousands of user preference variables to input points and perform analysis to determine that a probability value assigned to a user preference level exceeds a defined probability value.

In order to provide for or aid in the numerous inferences described herein (e.g., correlating user preference), components described herein can examine the entirety or a subset of data to which it is granted access and can provide for reasoning about or inferring states of a system, environment, etc., from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in construction of new events or actions from a set of observed events and/or stored event data, whether the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=confidence(class)$. Such classification can employ a probabilistic and/or statistical-based analysis (e.g., factoring into the analysis utilities and costs) to prognose or infer an action that a user desire to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

FIG. 1 illustrates a block diagram of an example, non-limiting system 100 that can facilitate automating home control in accordance with one or more embodiments described herein. Aspects of systems (e.g., system 100 and the like), apparatuses or processes explained in this disclosure can constitute one or more machine-executable components embodied within one or more machines, e.g., embodied in one or more computer readable mediums (or media) associated with one or more machines. Such components, when executed by the one or more machines, e.g., computers, computing devices, virtual machines, etc., can cause the machines to perform the operations described.

In various embodiments, the system 100 can be any type of component, machine, device, facility, apparatus, and/or instrument that comprises a processor. In some embodiments, system 100 is capable of effective and/or operative communication with a wired and/or wireless network. Components, machines, apparatuses, devices, facilities, and/or instrumentalities that can comprise the system 100 can include, but are not limited to, tablet computing devices, handheld devices, server class computing machines and/or databases, laptop computers, notebook computers, desktop computers, cell phones, smart phones, consumer appliances and/or instrumentation, industrial and/or commercial devices, digital assistants, multimedia Internet enabled phones, multimedia players, and the like.

As illustrated in FIG. 1, the system 100 can comprise bus 102, memory 104, processor 106, voice recognition component 108, face recognition component 110, authentication component 112, communication component 114, service component 116 and machine learning component 118. The bus 102 can provide for interconnection of various components of the system 100. The memory 104 and processor 106 can carry out computation and/or storage operations of the system 100 as described herein. It is to be appreciated that in some embodiments one or more system components can communicate wirelessly with other components, through a direct wired connection or integrated on a chipset.

The voice recognition component 108 can identify different authorized users (e.g., persons) based on voice signatures (e.g., voice characteristics). The voice recognition component 108 can analyze a multitude of characteristics (e.g., frequency, intensity, etc.) to identify the users and decipher meaning of speeches. One or more sound recordings of one or more users can be stored in the system (e.g., via a settings interface). The face recognition component 110 can identify the users based on facial features (e.g., shape, size, relative positions, etc.).

The authentication component 112 can analyze and verify whether a voice and face of a user matches the voice and face of an authorized user. The authentication component 112 provide the homeowners control over the level of access to functionalities for different users. If a user's voice and face match the stored voice recordings and photos of an authorized user, the authentication component 112 can verify that the user is an authorized user with control access to functionality of the system 100. Based on the verification on who the user is, the access to functionalities can be set at different levels for different users. Also, different settings and preferences can be based on the recognized users. For example, the authentication component 112 can verify the user and the user preference (e.g., room temperature, lighting, level of access to functionalities, etc.) can be automatically set.

In some embodiments, the authentication component 112 can employ verifying information of authorized users to keep track of how frequent a user enters and leaves a room or the home. The authentication component 112 can identify an intruder with certainty based on recognizing that the intruder is not an authorized user by comparing and analyzing the intruder's voice and face with the stored voice recordings and photos of all the authorized users. In an implementation, the authentication component 112 can provide different levels of access to functionality (e.g., parents/owners would have full access, children would have limited access, maids have other access, etc.) based on the user settings. For example, the homeowners can change the alarm passcodes and operate certain appliances like an oven while the children have limited access and can only turn on and off the television and the lights. In another example, the maid can be restricted from using the television except for accessing music channels. The maid can also be restricted to change passwords and user preference settings.

In another embodiment, the user settings can be modified via a settings interface accessible by one or more devices on the network. For example, the homeowner can remotely expose additional functionality if a child needs it. In another example, phone calls that can be authenticated can be placed to the automated home control system (e.g., system 100 and the like) with instructions from the homeowner. Furthermore, email instructions or text messages from the homeowner can inform the automated home system when to expect the made to arrive and to notify the homeowner if the maid stays over the allotted time. If the authentication component 112 detect the maid is with someone it does not recognize, a notification can be sent to inform the homeowner as well.

The system 100 can be set to ignore users (e.g., persons) whose voice and/or face cannot be verified by the authentication component 112. In another implementation, the authentication component 112 can include an override mechanism based on verification information of one or more persons (e.g., polices, fire fighters, medical personnel, etc.) in response to an emergency. For example, a password ca be employed or verifying information on the person can be located.

The communication component 114 can facilitate transmitting and receiving information (e.g., through one or more internal or external networks 120 (wired or wireless networks)) between one or more system 100 and other devices (e.g., thermostats, lights, washers/dryers, appliances, electronics, cameras, surveillance cameras, drones, robots, televisions, sound systems, phones, smoke/carbon monoxide detectors, doors, garage doors, alarms, automobiles, etc.). The service component 116 can execute a set of functions by the system 100 based on the commands (e.g., instructions to provide a service) from the authorized users that have been verified by the authentication component 112 and based on information collected by the service component 116 from one or more devices (e.g., the washer/dryer is ready for unloading). Commands from an authorized user can be voice commands or instructions through one or more devices (e.g., mobile phone, computer, etc.).

The service component 116 can employ voice and face recognition to locate a user (e.g., an authorized user) and automatically provide (e.g., without a command) user preference services. In an implementation, the system 100 can locate a user by associating the user with the one or more devices connected to the one or more networks. For example, the system 100 can track the location of a user via the location service from the user's mobile phone and turn on the lights when the user enters a dark room that is not equipped with a recording device or a device embodying the voice recognition component 108, face recognition component 110 or authentication component 112. The service component 116 can employ the communication component 114 to transmit information and automatically modify (e.g., without a command) a service (e.g., turning on the television, opening the garage door, etc.) based on the user setting. For example, based on the user setting the service component 116 can open the garage door when the user's car is detected driving up to the garage. In another example, the service component 116 can prevent children from accessing certain channels, setting security alarms, activating appliances, etc. For example, based on the user setting, the service component 116 can ignore commands from a child to order a movie, and it can deactivate a child's selection to order a movie.

The machine learning component 118 can learn user preferences by correlating a set of functions (e.g., setting the temperature, dimming the lights, etc.) with the authorized users in order to provide information to the service component 116 to automatically modify a service. For example, the machine learning component 118 can correlate a home environmental setting (e.g., via the communication component 114) with an authorized user identification to learn the user preference of an authorized user. In another example, the machine learning component 118 can learn the user preference by collecting the home environmental setting commands from the authorized users. In yet another example, the machine learning component 118 can obtain user preference from the user preference settings set and stored in the system 100 by an authorized user (e.g., via a settings interface). For example, based on the data learned and/or obtained by the machine learning component 118, the machine learning component 118 can provide information to the service component 116 to modify a service such as changing the temperature when a user enters a room according to the user's preference.

Figure 2:
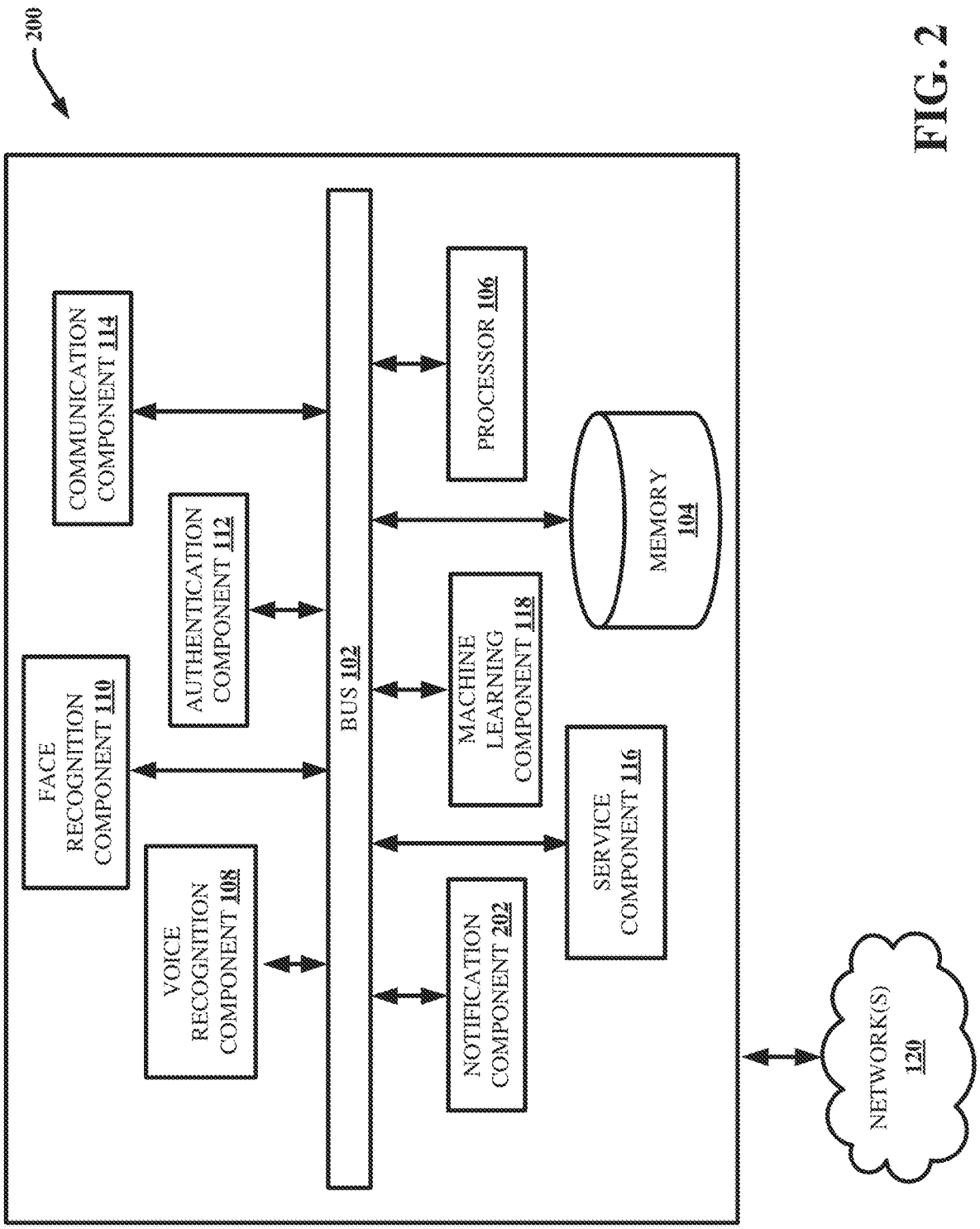
FIG. 2 illustrates a block diagram of an example, non-limiting system facilitating automating home control including a notification component in accordance with one or more embodiments described herein.

FIG. 2 illustrates a block diagram of an example, non-limiting system 200 that can utilize a notification component 202. The notification component 202 can generate notifications to send to an authorized user based on information collected by the service component 116. For example, the service component 116 can collect information from a washer/dryer that laundry is ready to be unload (e.g., via the communication component 114), and the notification component 202 can generate a notification that laundry is ready to be unload based on the collected data. In another example, the service component 116 can collect information from an authorized user to remind the children when study break is over, and the notification component 202 can generate a notification that it is time to go back to homework. The notification can be generated via an audio broadcast or written message (e.g., text message, email, etc.). A notification can be generated via an audio broadcast when the user is detected and verified. The user settings can be set (e.g., via the settings interface) to specify how notifications should be sent. For example, the notifications setting can be set to never send notifications via an audio broadcast or only send an audio broadcast when there are no unauthorized users (e.g., guests to the home) are present or when there are no children present.

In additional embodiments, the notification component 202 can notify the designated users when the housekeeper enters the household. If the housekeeper is using or attempting to use an unauthorized function of the automated home control system, the notification component 202 can send notifications to the designated users. The notification component 202 can send alerts to the parents when the children are arguing. The notification component 202 can also notify the parents when there is an emergency with high confidence and notify the fire or police department of the emergency.

The notification component 202 can use all sorts of different modalities for sending notifications such as email, text messaging, phone calls, tweets, etc. The system can identify the location of a user using a global positioning system (GPS). If the user is on a phone call, the notification component 202 can send notifications to the user via text messaging, instead of phone calling, or any number of preferred form of notification. The notification component 202 can also be set to send out notifications to multiple people.

Figure 3:
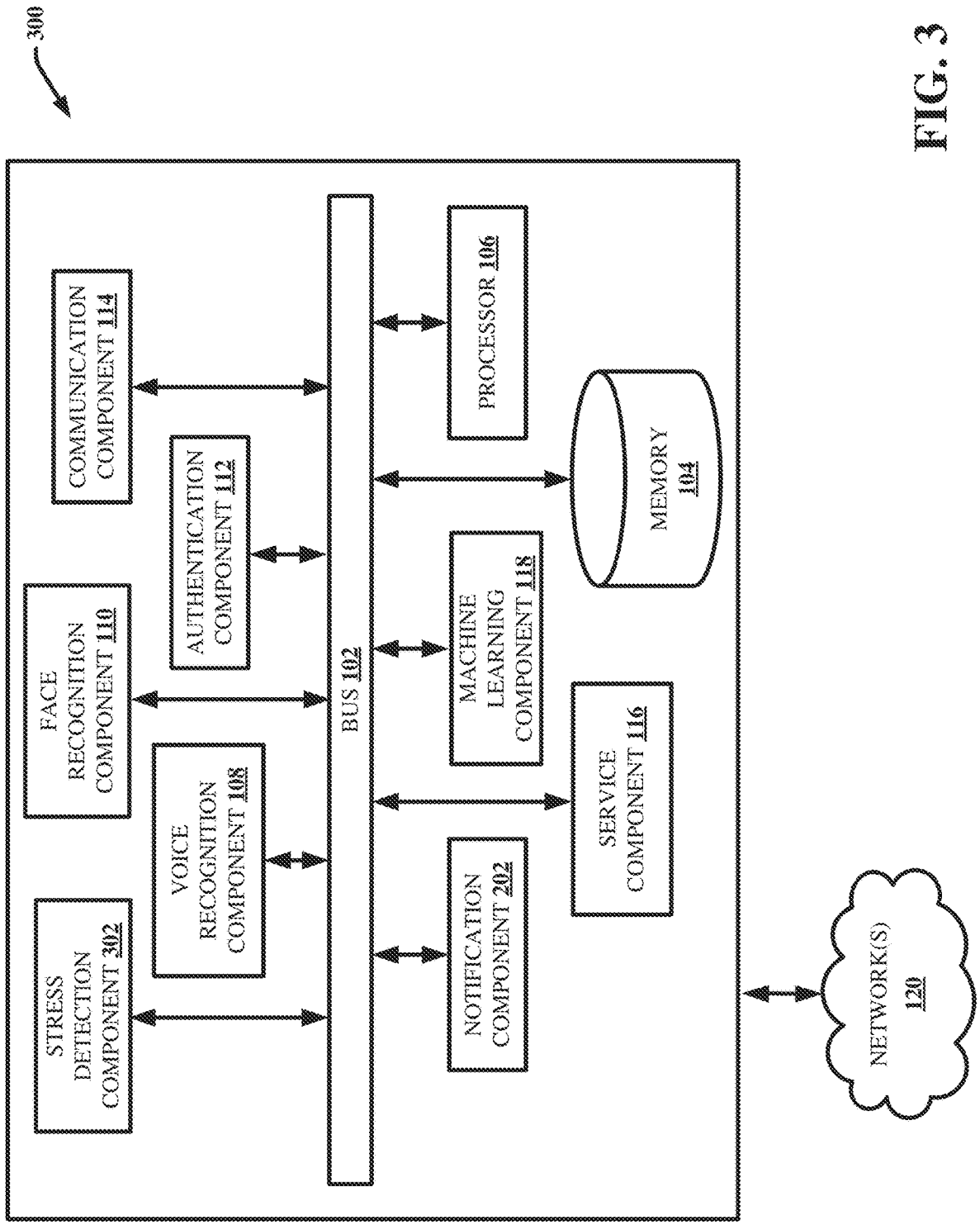
FIG. 3 illustrates a block diagram of an example, non-limiting system facilitating automating home control including a stress detection component in accordance with one or more embodiments described herein.

FIG. 3 illustrates a block diagram of an example, non-limiting system 300 that can include a stress detection component 302. The stress detection component 302 can analyze stress levels to determine whether a preselected set of users (e.g., the children and not the adults) are exhibiting stress (e.g., fighting). The determination of whether a preselected user is exhibiting stress is based on data collected by the voice recognition component 108. For example, the stress detection component 302 can analyze frequency, intensity, etc., of a voice to determine whether one or more children are yelling and crying. The determination that a preselected user (e.g., a child) exhibits stress can trigger one or more notifications to be sent to one or more authorized users (e.g., the parents).

In some embodiments, the stress detection component 302 can detect stress based on patterns recognition. For example, the stress detection component 302 can detect stress based on inflection of the voice and use of words. In another example, the stress detection component 302 can detect stress based on recognition of facial expressions. In other embodiments, the stress detection component 302 can detect stress in a pet's bark or behavior. For example, the stress detection component 302 can recognize and detect stress in a normally quiet dog that is now constantly by the window barking. The unusual barking by the dog can cause the automated home control system to send an alert to the home owner. The automated home control system can also be set to send a notification to the homeowner when certain sounds can be detected. For example, a notification can be sent to the homeowners if the sound of glass breaking, children crying, loud screaming, etc., can be detected.

Figure 4:
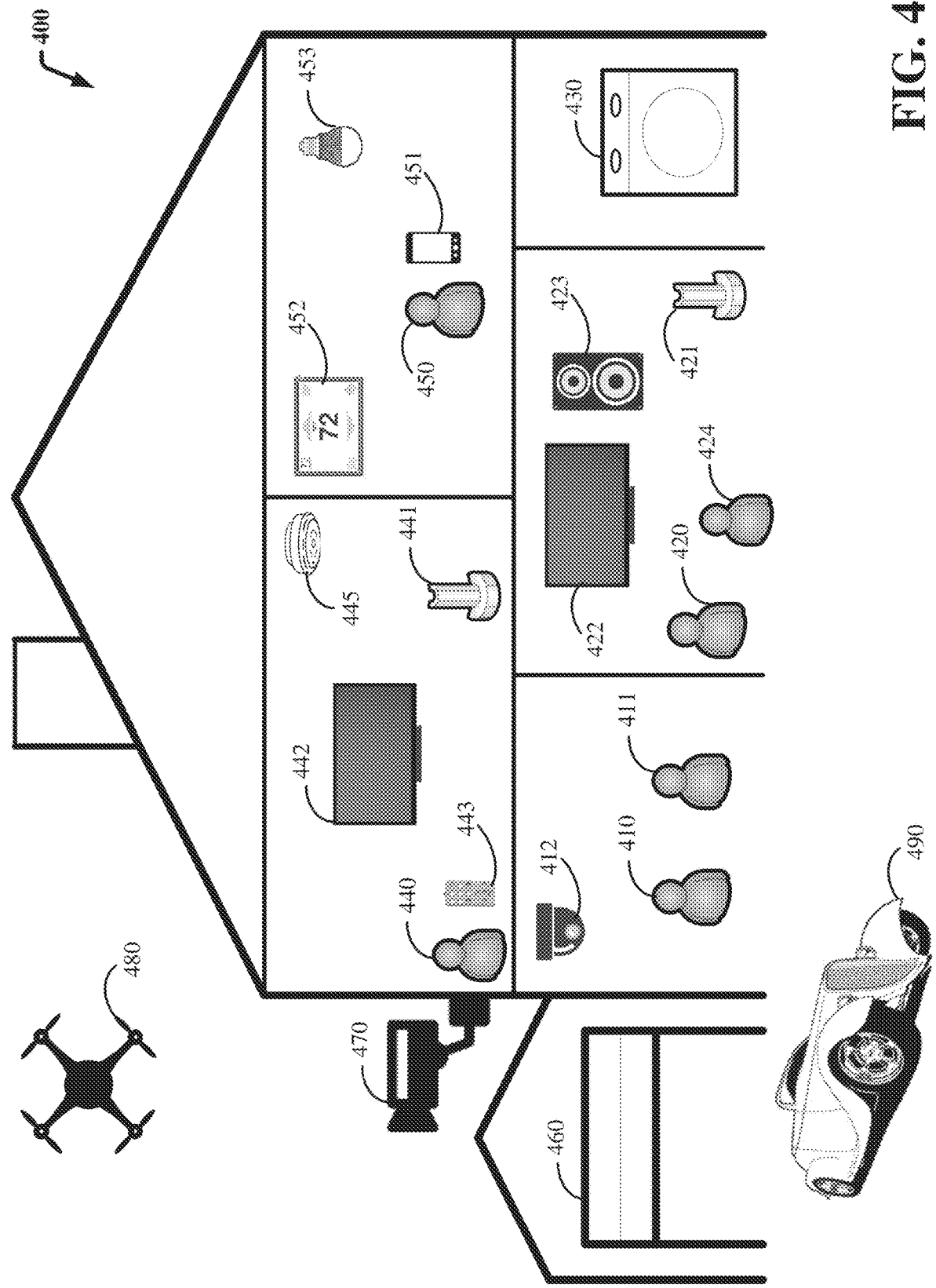
FIG. 4 illustrates an example, non-limiting representation of how the system can be used in accordance with one or more embodiments described herein.

FIG. 4 illustrates an example, non-limiting representation of a home 400 in the interior. Both user 410 and user 411 are children, and thus, preselected to have notifications sent to the parents if they are fighting. The camera 412 can record sounds and images of the interactions between the user 410 and user 411. Both system 421 and system 441 can interface with camera 412 (e.g., via wireless communication component 114) and analyze the facial features and voice signatures of the user 410 and user 411 synchronously as their interactions take place. The system 421 and system 441 are automated home control systems with one or more embodiments and/or components described herein. If a determination is made that the user 410 and 411 are exhibiting stress or fighting (e.g., via the stress detection component 302), the notification component 202 from either system 421 or system 441 can send the user 450 (e.g., a parent) a text message on mobile phone 451.

Upon detection of the presence of the user 420 (e.g., via voice recognition component 108 and face recognition component 110) and verifying that the user 420 is an authorized user (e.g., via the authentication component 112), the service component 116 of the system 421 can executes commands from the user 420. For example, the user 420 can speak a command to turn the television 422 on and lower the volume on the sound system 423, and the service component 116 can execute those commands. The system 421 can ignore commands from the user 424 who is an unauthorized user. The system 421 can transmit and receive information from the washer/dryer 430 and broadcast (e.g., via communication component 114) to the user 420 (e.g., a parent) and send a message to the user 450 through mobile phone 451 that laundry is done.

The user 440 (e.g., a child) is an authorized user with limited access to electronic devices. The system 441 can identify the user 440 (e.g., via the voice recognition component 108 and the face recognition component 110) and verify (e.g., via the authentication component 112) that the user 440 is an authorized user with limited access (e.g., via programmed instructions). The user 440 can command the system 441 to turn on the television, change the channel and change the volume. The system 441 can invalidate commands from the user 440 to obtain unauthorized access (e.g., accessing prohibited channels, ordering movies, etc). For example, if the user 440 controls remote 443 to change the television 442 to a prohibited channel, the system 441 can communicate with the television 442 (e.g., via communication component 114) to block the prohibited channel. Information from the smoke/carbon monoxide detector 445 can be transmitted to the system 421 and system 441 to send alerts to all the users if smoke/carbon monoxide is detected.

The systems 421 and system 441 can locate the user 450 by receiving location data from the mobile phone 451 belonging to the user 450. The system 421 and system 441 can communicate with each other and send the thermostat 452 instructions to set the temperature according to the preference of the user 450. The system 421 and system 441 can turn on and dim the light 453 according to the preference of the use 450. The user preference can be communicated to the system 421 and system 441 through programmed instructions or acquire through the machine learning component 118 (e.g., matching user identification with device setting).

The user 450 can send a message by mobile phone 451 to the system 421 and system 441 to inquire whether the garage door 460 is close and if it is not, to close it. The user 450 can send a request by mobile phone 451 to the system 421 and system 441 to show the current image being recorded by outdoor surveillance camera 470. A request can be made to the system 421 and 441 to pull up past recorded images. The system 421 and system 441 can communicate with the drone 480 (e.g., via communication component 114) and grant the drone 480 access to land inside the garage 460 by opening the garage 460. The system 421 and system 441 can communicate with automobile 490 and open the garage 460 upon detecting that the automobile 490 is approaching the garage 460.

Figure 5:
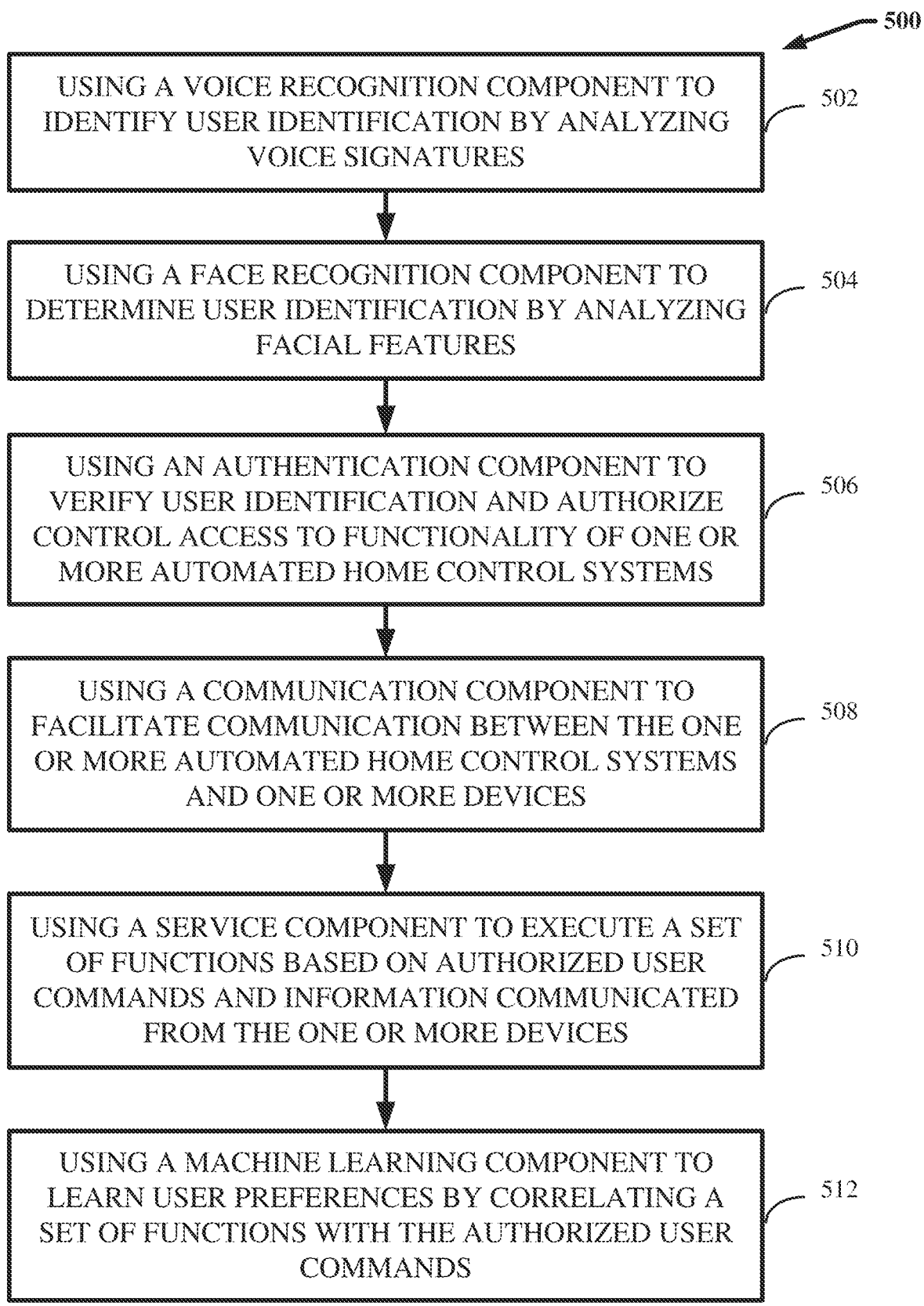
FIG. 5 illustrates an example, non-limiting computer-implemented method in accordance with one or more embodiments described herein.

FIG. 5 illustrates a flow diagram of an example, non-limiting computer-implemented method 500 in accordance with one or more embodiments described herein. Repetitive description of like elements employed in other embodiments described herein is omitted for sake of brevity. At 502, the computer-implemented method can comprise using a voice recognition component (e.g., voice recognition component 108) to identify user identification by analyzing voice signatures. The voice recognition component 108 can identify a person's voice based on collecting and learning a person's voice through a period of time. The recognition of an authorized user's voice can enable automatic authentication of the user for control access to the functionality of the system. For example, a person entering a room while talking can be recognized by the voice recognition component 108 and automatically regulate home environmental settings (e.g., via the service component 116).

At 504, the computer-implemented method can comprise using a face recognition component (e.g., face recognition component 110) to determine user identification by analyzing facial features. The face recognition component 110 can identify a person's face based on collecting and learning a person's facial characteristics through a period of time. The recognition of an authorized user's facial characteristics can enable automatic authentication of the user for control access to the functionality of the system. For example, a person entering a room can be recognized by the face recognition component 110 and automatically regulate home environmental settings (e.g., via the service component 116).

At 506, the computer-implemented method can comprise using an authentication component (e.g., authentication component 112) to verify user identification and authorize control access to functionality of one or more automated home control systems. The authentication component 112 can authenticate a user based on voice recognition and face recognition. The authentication of a user can also automatically set the level of access to functionality for that user. For example, upon authenticating the maid's presence, the automated home control system can limit access of the television to only turn on music playing channels. The limited access to only play music can help ensure that the maid is not distracted from house cleaning duties by watching movies.

At 508, the computer implemented method can comprise using a communication component (e.g., communication component 114) to facilitate communication between the one or more automated home control systems and one or more devices. The communication between the automated home control systems and devices can facilitate the transferring of data between the automated home control systems and devices. For example, upon authenticating the maid's presence at an unscheduled time, the communication component 114 transmit this information to all devices in the home, which can be set to lock all functionality upon detection of the maid's unscheduled presence.

At 510, the computer-implemented method can comprise using a service component (e.g., service component 116) to execute a set of functions based on authorized user commands and information communicated from the one or more devices. For example, the service component 116 can execute a command by the maid to lower the room temperature. The service component 116 can also automatically modify a service such as setting the maid's preferred room temperature upon detection of the maid's presence in the room.

At 512, the computer-implemented method can comprise using a machine learning component to learn user preferences by correlating a set of functions with the authorized user commands. For example, if the maid always commands the home automated home control system to set the temperature at 70 degrees, over time, the machine learning component can make the correlation and learn that the maid's preferred temperature setting is 70 degrees. Even if the maid manually reset the temperature to 70 degrees, over time, the machine learning component 118 can correlate the maid's presence with the temperature setting and learn that the maid's preferred temperature setting is 70 degrees.

Figure 6:
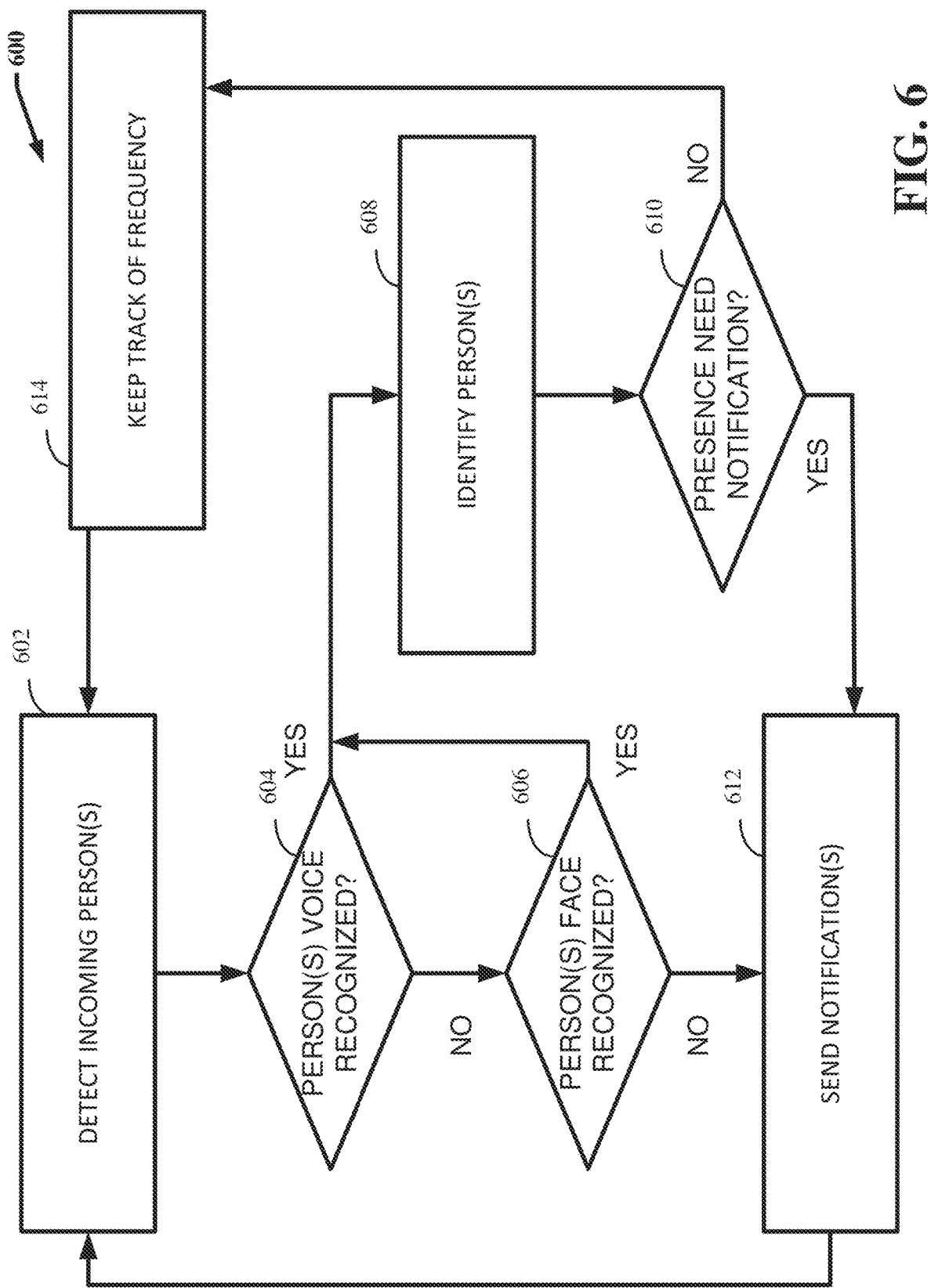
FIG. 6 illustrates an example, non-limiting computer-implemented method in accordance with one or more embodiments described herein.

FIG. 6 illustrates a flow diagram of an example, non-limiting computer-implemented method 600 to detect when certain persons enter the home (e.g., when the children come home or when intruders enter the home) in accordance with one or more embodiments described herein. Repetitive description of like elements employed in other embodiments described herein is omitted for sake of brevity. At 602, the computer-implemented method 600 can comprise detecting one or more incoming persons entering the home (e.g., via the voice recognition component 108 and face recognition component 110). Then at 604, the computer-implemented method 600 can comprise determining whether the one or more persons have a voice authorized to enter the home (e.g., via the voice recognition component 108). If no person has a voice authorized to enter the home or no voice is detected, then at 606, the computer-implemented method 600 can comprise determining whether the one or more persons have a face authorized to enter the home (e.g., via the face recognition component 110). If no person has a face authorized to enter the home or no face is detected, then at 612, the computer-implemented method 600 can comprise sending one or more notifications to one or more selected users (e.g., via the notification component 202). If at 604 one or more voices authorized to enter the home are detected or at 606 one or more faces authorized to enter the home are detected, then at 608, the computer-implemented method 600 can comprise identifying the one or more persons (e.g., via the voice recognition component 108 and the face recognition component 110). At 610, the computer-implemented method 600 can comprise determining whether the presence of the one or more person (e.g., children) require notification to be sent to the one or more users (e.g., accessing stored program instructions). If yes, then at 612, the computer-implemented method 600 can comprise sending one or more notification to one or more selected users (e.g., via the notification component 202). If no, then at 614, the computer-implemented method can comprise keeping track of the frequency of the one or more persons (e.g. children) leaving and entering.

Figure 7:
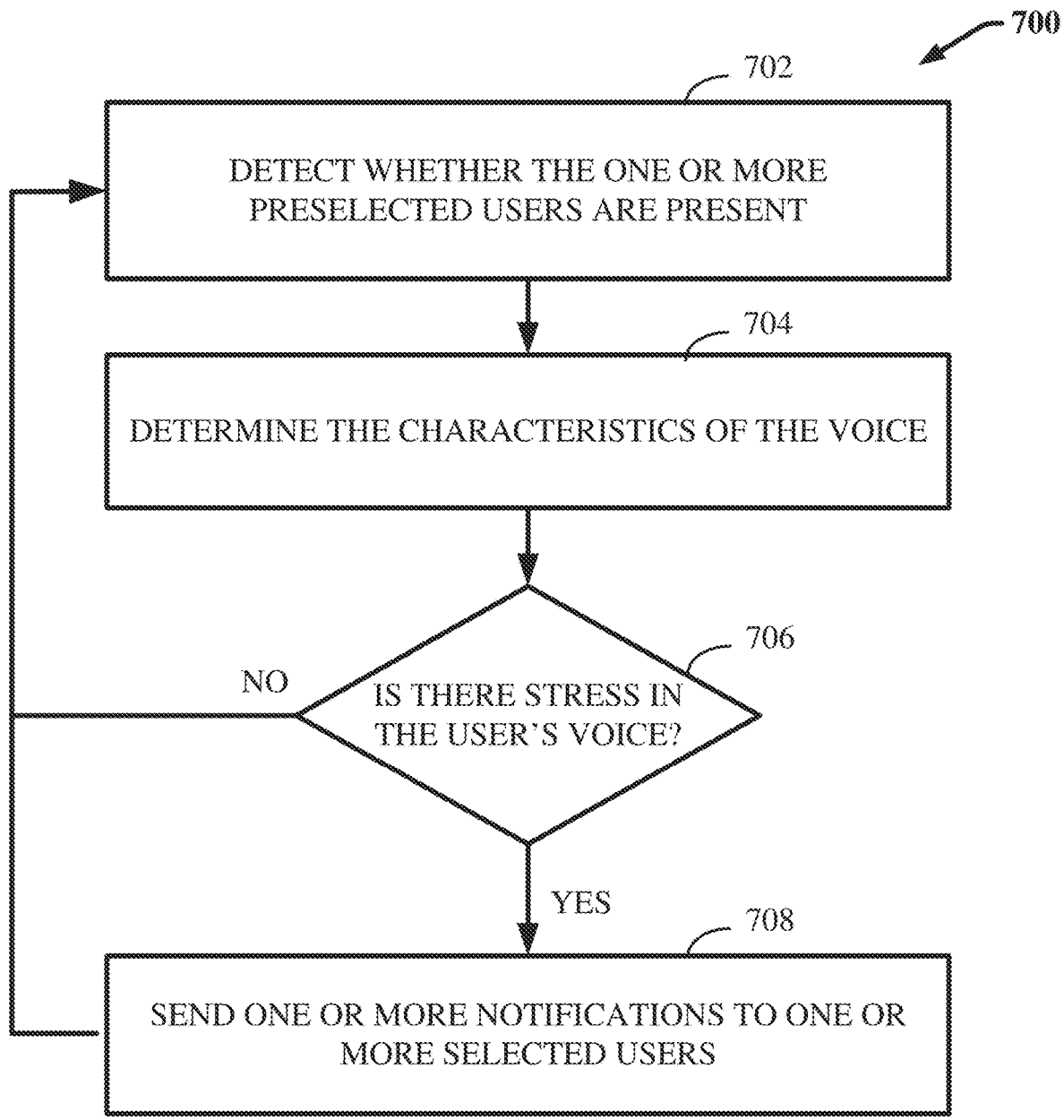
FIG. 7 illustrates an example, non-limiting computer-implemented method in accordance with one or more embodiments described herein.

FIG. 7 illustrates a flow diagram of an example, non-limiting computer-implemented method 700 to detect whether the children are stressed (e.g., fighting) in accordance with one or more embodiments described herein. Repetitive description of like elements employed in other embodiments described herein is omitted for sake of brevity. At 702, the computer-implemented method 700 can comprise detecting whether the one or more preselected users (e.g., the children) are present (e.g., via the voice recognition component 108 and face recognition component 110). At 704, the computer-implemented method 700 can comprise determining the characteristics (e.g., tone, pitch, frequency, resonance, etc.) of the voice (e.g., via the voice recognition component 108). At 706, determine whether the one or more preselected users are yelling or crying (e.g., via the voice recognition component 108). If no there are not yelling or crying, then at 708, the computer-implemented method can comprise sending on one or more notifications (e.g., via the notification component 202) to one or more selected users (e.g., the parents).

Figure 8:
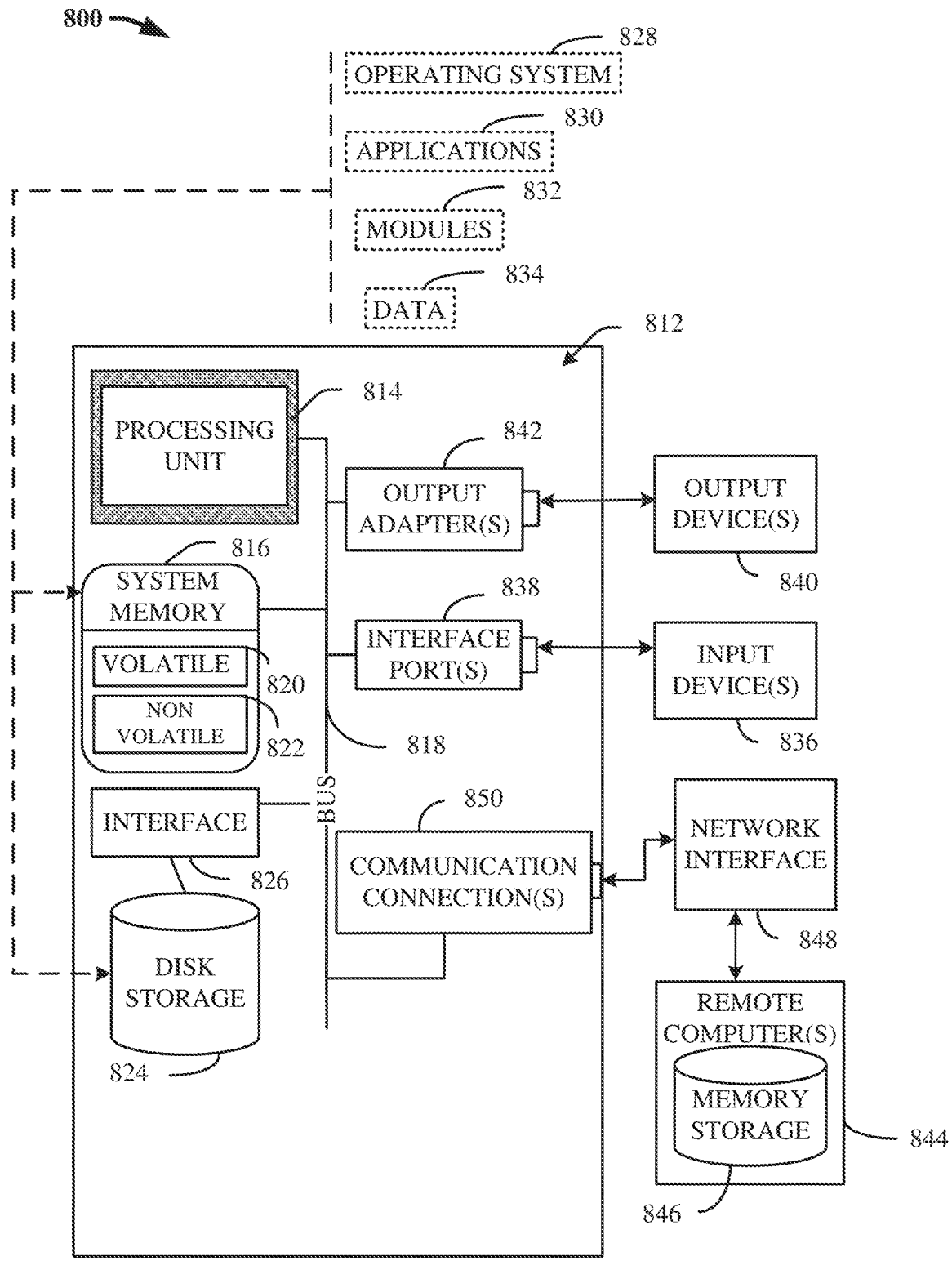
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 820 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 812 can also include removable/non-removable, volatile/nonvolatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
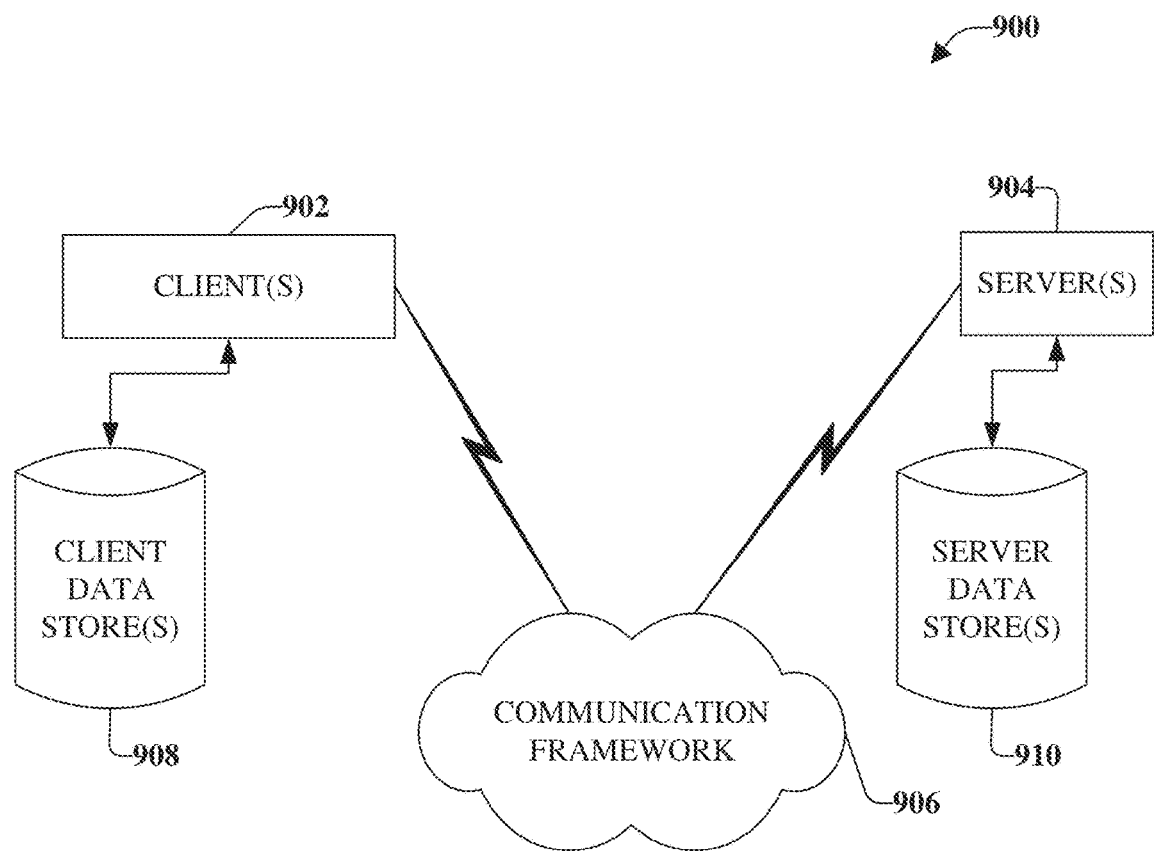
FIG. 9 illustrates a block diagram of an example, non-limiting methodology training a model in accordance with various aspects disclosed herein.

Referring now to FIG. 9, there is illustrated a schematic block diagram of a computing environment 900 in accordance with this specification. The system 900 includes one or more client(s) 902, (e.g., computers, smart phones, tablets, cameras, PDA's). The client(s) 902 can be hardware and/or software (e.g., threads, processes, computing devices). The client(s) 902 can house cookie(s) and/or associated contextual information by employing the specification, for example.

The system 900 also includes one or more server(s) 904. The server(s) 904 can also be hardware or hardware in combination with software (e.g., threads, processes, computing devices). The servers 904 can house threads to perform transformations of media items by employing aspects of this disclosure, for example. One possible communication between a client 902 and a server 904 can be in the form of a data packet adapted to be transmitted between two or more computer processes wherein data packets may include coded analyzed headspaces and/or input. The data packet can include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

In one exemplary implementation, a client 902 can transfer an encoded file, (e.g., encoded media item), to server 904. Server 904 can store the file, decode the file, or transmit the file to another client 902. It is to be appreciated, that a client 902 can also transfer uncompressed file to a server 904 and server 904 can compress the file and/or transform the file in accordance with this disclosure. Likewise, server 904 can encode information and transmit the information via communication framework 906 to one or more clients 902.

The illustrated aspects of the disclosure may also be practiced in distributed computing environments where certain tasks are performed by remote processing devices that are linked through a communications network. In a distributed computing environment, program modules can be located in both local and remote memory storage devices.

Moreover, it is to be appreciated that various components described herein (e.g., detection components, input components, sample delivery components, and the like) can include electrical circuit(s) that can include components and circuitry elements of suitable value in order to implement the aspects of this innovation(s). Furthermore, it can be appreciated that many of the various components can be implemented on one or more integrated circuit (IC) chips. In one exemplary implementation, a set of components can be implemented in a single IC chip. In other exemplary implementations, one or more of respective components are fabricated or implemented on separate IC chips.

What has been described above includes examples of the implementations of the present invention. It is, of course, not possible to describe every conceivable combination of components or methodologies for purposes of describing the claimed subject matter, but it is to be appreciated that many further combinations and permutations of this innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

The aforementioned systems/circuits/modules have been described with respect to interaction between several components/blocks. It can be appreciated that such systems/circuits and components/blocks can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than or equal to 11" can include any and all sub-ranges between (and including) the minimum value of zero and the maximum value of 11, that is, any and all sub-ranges having a minimum value of equal to or greater than zero and a maximum value of equal to or less than 11, e.g., 1 to 5. In certain cases, the numerical values as stated for the parameter can take on negative values.

In addition, while a particular feature of this innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification are not necessarily all referring to the same implementation. Furthermore, the particular features, structures, or characteristics may be combined in any suitable manner in one or more implementations.

Further, references throughout this specification to an "item," or "file," means that a particular structure, feature or object described in connection with the implementations are not necessarily referring to the same object. Furthermore, a "file" or "item" can refer to an object of various formats.

As used in this application, the terms "component," "module," "system," or the like are generally intended to refer to a computer-related entity, either hardware (e.g., a circuit), a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. While separate components are depicted in various implementations, it is to be appreciated that the components may be represented in one or more common component. Further, design of the various implementations can include different component placements, component selections, etc., to achieve an optimal performance. Further, a "device" can come in the form of specially designed hardware; generalized hardware made specialized by the execution of software thereon that enables the hardware to perform specific function (e.g., media item aggregation); software stored on a computer readable medium; or a combination thereof.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. An automated home control system, comprising:
a processor that executed the following computer executable components stored in a memory:
  a voice recognition component that identifies user identification by analyzing voice signatures;
  a face recognition component that determines the user identification by analyzing facial features;
  an authentication component that verifies the user identification and authorizes control access to functionality of one or more automated home control systems, wherein, if the user's presence does not require notification, the authentication component employs verifying information of authorized users to keep track of a selected user's frequency of change of location amongst locations comprising at least rooms of a home, entering the home, and exiting the home;
  a communication component that facilitates communication between the one or more automated home control systems and one or more devices;
  a service component that executes a set of functions based on authorized user commands and information communicated from the one or more devices; and
  a machine learning component that learns user preferences by correlating a set of functions with the authorized user commands.

2. The system of claim 1, wherein the authentication component authorizes control access for one or more levels of access to functionality.

3. The system of claim 2, wherein the authentication component includes an override mechanism based on verification information of one or more persons in response to an emergency.

4. The system of claim 1, further comprising a notification component that generates and sends one or more notifications to one or more users.

5. The system of claim 4, further comprising a stress detection component that analyzes whether stress exists for one or more selected users.

6. The system of claim 5, wherein the detection of stress from the one or more selected users prompts the notification component to send one or more notifications to one or more users.

7. The system of claim 1, wherein the machine learning component learns respective user preference.

8. The system of claim 1, wherein the system operates independently or in association with one or more systems.

9. The system of claim 1, wherein the authentication component identifies intruders with certainty.

10. A method for facilitating automating home control, comprising:
    identifying, by a system comprising a processor, user identification by analyzing at least one of voice signatures or facial features;
    verifying, by the system, the user identification to authorize control access to functionality of one or more automated home control systems;
    verifying, by the system, if the user's presence does not require notification, information of authorized users to keep track of a selected user's frequency of change of location amongst locations comprising at least rooms of a home, entering the home, and exiting the home;
    facilitating, by the system, communication between the one or more automated home control systems and one or more devices;
    executing, by the system, a set of functions based on authorized user commands and information communicated from the one or more devices; and
    learning, by the system, user preferences by correlating a set of functions with the authorized user commands.

11. The method of claim 10, further comprising authorizing, by the system, control access for one or more levels of access to functionality.

12. The method of claim 10, further comprising generating and sending, by the system, one or more notifications to one or more users.

13. The method of claim 12, further comprising analyzing, by the system, whether stress exists for one or more selected users.

14. The method of claim 13, further comprising, in response to the detection of stress from the one or more selected users, sending, by the system, one or more notifications to one or more users.

15. A computer program product for facilitating automating home control, the computer program product comprising a non-transitory computer readable medium having program instructions embodied therewith, the program instructions executable by a processor to cause the processor to:
    identify user identification by analyzing at least one of voice signatures or facial features;
    verify the user identification to authorize control access to functionality of one or more automated home control systems;
    verifying, if the user's presence does not require notification, information of authorized users to keep track of a selected user's frequency of change of location amongst locations comprising at least rooms of a home, entering the home, and exiting the home;
    facilitate communication between the one or more automated home control systems and one or more devices;
    execute a set of functions based on authorized user commands and information communicated from the one or more devices; and
    learning user preferences by correlating a set of functions with the authorized user commands.

16. The computer program product of claim 15, wherein the program instructions are further executable by the processor to cause the processor to: authorize control access for one or more levels of access to functionality.

17. The computer program product of claim 15, wherein the program instructions are further executable by the processor to cause the processor to: use a notification component that generates and sends one or more notifications to one or more users.

18. The computer program product of claim 17, wherein the program instructions are further executable by the processor to cause the processor to: analyze whether stress exists for one or more selected users.

19. The computer program product of claim 18, wherein the program instructions are further executable by the processor to cause the processor to: in response to the detection of stress from the one or more selected users, to send one or more notifications to one or more users.

20. The computer program product of claim 15, wherein the program instructions are further executable by the processor to cause the processor to: identify intruders with certainty.

* * * * *